Patented Oct. 15, 1929

1,731,641

UNITED STATES PATENT OFFICE

DAVID M. TILLER AND W. W. FERREE, OF KANSAS CITY, MISSOURI

PROCESS AND COMPOSITION FOR TREATING METALS

No Drawing.   Application filed August 16, 1926. Serial No. 129,666.

Our invention relates to the treatment of metals and has for its object the provision of processes whereby metals are improved in certain of their physical qualities, and the invention relates as well to novel compositions, mixtures, or solutions for use in the processing of various metals to better adapt them to their particular uses.

A further object of our invention resides in the treatment of metals for the purpose of increasing the conductivity, tensile strength, elasticity, resistance to corrosion, toughness, hardness, heat resistance, etc.

Another object of our invention is to provide a process of and composition for improving various metals such as copper, aluminum, cold rolled steel, nickel steel, nichrome steel, gold, silver, etc., by treatment of the same with solutions or mixtures containing compounds of mercury, particularly the halides of mercury, whereby the metals are rendered harder, tougher, more elastic, more resistant to heat and corrosion, and whereby they are increased in tensile strength, durability, temper, and in general made more adaptable to industrial uses.

Our novel composition employed in the process above outlined comprises in its preferred form a solution or mixture of a mercuric halide, a salt of an alkali metal (preferably sodium or potassium chloride), and an acid of the fatty-acid series having the general formula $HC_nH_{2n-1}O_2$ such as acetic acid, formic acid, propionic acid, butyric acid, palmitic acid, stearic acid, etc. As the mercuric halide in our composition we have found mercuric chloride (corrosive sublimate) and mercuric iodide most suitable and prefer to employ a mixture of these two salts. It is to be understood, however, that other halides of mercury are also effective. Of the acids having the general formula $HC_nH_{2n-1}O_2$ we prefer to employ acetic acid in the form of vinegar.

In the treatment of certain metals, as hereinafter pointed out in detail, we dispense with the acid as an ingredient of the composition and employ a solution of mercuric halides and sodium chloride in water.

In order that our invention may be more clearly understood, certain preferred and practical embodiments of the same are hereinafter set forth, these embodiments being for illustrative purposes only as it is not intended that the invention be limited thereby.

*Example I*

In the treatment of hard drawn copper for the purpose of raising its conductivity, the copper was heated to approximately 200° C. and then submerged for about thirty minutes in a solution comprising one and one-half (1½) pounds sodium chloride, two (2) ounces mercuric chloride, one (1) ounce mercuric iodide, and one-half (½) pint acetic acid (in the form of vinegar). The metal was then removed and annealed under approximately five hundred (500) pounds pressure whereupon the conductivity thereof was found to be materially increased.

By reheating the thus treated copper to approximately 200° C. and submerging for two hours in fish oil containing one-half (½) ounce mercuric chloride per one-half (½) pint, (the fish oil-chloride mixture being little more than luke-warm), removing, and annealing with approximately five hundred (500) pounds per square inch pressure, the copper was found to possess a still higher degree of conductivity and increased tensile strength, elasticity, and ability to resist corrosion.

*Example II*

Aluminum was heated to a cherry red heat and then submerged for twenty-four hours in the acetic acid solution of sodium chloride and mercuric halides as given in Example I. The aluminum was then removed, annealed with about 50,000 pounds per square inch pressure, and then submerged for twenty-four hours in vinegar. By this treatment the aluminum was increased in tensile strength and elasticity.

*Example III*

Cold rolled steel may be improved with respect to toughness, hardness, tensile strength, and elasticity by heating to a white heat, submerging for from three to six seconds in a solution comprising three (3) gallons of water, one (1) ounce mercuric iodide, one and one-half (1½) pounds sodium chloride, and two (2) ounces mercuric chloride, then removing and reheating to a white heat, again submerging in the above aequeous solution of salt and mercuric halides until the heat color disappears, removing, and cooling in an air current of a fan traveling at the rate of about 1,400 revolutions per minute. This method is particularly useful in treating dies, etc. which cannot be annealed.

Nickel steel may be treated in a manner similar to that above disclosed for rolled steel with the exception that it is heated only to a cherry red heat and when submerged the second time, it is allowed to remain in the solution until it may be handled with ease.

*Example IV*

Nichrome steel may be improved so that its heat resistance is materially above that of ordinary steel by heating to a white heat and submerging until the heat color disappears in a solution comprising three (3) gallons of water, one (1) ounce mercuric iodide, one and one-half (1½) pounds sodium chloride, and two (2) ounces mercuric chloride. The nichrome steel is now removed and submerged until cool in the solution given under Example I and comprising, one and one-half (1½) pounds sodium chloride, two (2) ounces mercuric chloride, one (1) ounce mercuric iodide, and one-half (½) pint vinegar. Following this treatment the nichrome steel is heated to a cherry red heat and submerged until cool in the first mentioned solution.

*Example V*

Silver and eighteen karat gold were increased in tensile strength, hardness, etc. by heating to a red heat, formed into the desired shape, reheated to red heat, submerged for fifteen minutes in the acetic acid solution given under Example I, and then submerged for twenty minutes in vinegar.

*Example VI*

Nichrome steel is a heat resistant steel which up to the present time has been made fifty-six points in heat resistance above ordinary steel. By our process we are able to raise it thirty-six points, thus rendering it ninety-two points above ordinary steel.

The treatment consists in heating the nichrome steel to a white heat followed by a bath in a solution comprising three (3) gallons of water, one and one-half (1½) pounds sodium chloride, and two (2) ounces mercuric chloride, the steel being allowed to remain in the solution until its white heat disappears. The steel is now submerged until cool in a mixture of one and one-half (1½) pounds sodium chloride, two (2) ounces mercuric chloride, and one (1) ounce mercuric iodide to which has been added a sufficient quantity of acetic acid to form a mush. This treatment not only adds to the heat resistance of the nichrome steel but also to its toughness.

By treatment of copper with the above composition comprising one and one-half (1½) pounds sodium chloride, two (2) ounces mercuric chloride, one (1) ounce mercuric idodide, and acetic acid followed by rolling of the metal under a pressure of from 15,000 to 20,000 pounds per square inch the conductivity of the copper was found to be materially enhanced.

*Example VII*

Cold rolled steel was heated to a temperature of 1700° F. and then submerged until disappearance of the red heat in the solution consisting of three (3) gallons water, one and one-half (1½) pounds sodium chloride, and two (2) ounces mercuric chloride referred to under Example VI. The steel was then cooled to room temperature in front of an electric fan running between 1,300 and 1,400 revolutions per minute. The treatment was found to add toughness and hardness to the cold rolled steel.

We have described our invention with considerable particularity as applied to the treatment of specific metals and alloys but it is to be understood that our process may be practiced and our novel compositions used in the improvement of practically all metals to add to toughness, hardness, tensile strength, and other physical properties. Various changes may be made in the specific examples enumerated above without departing from the spirit or scope of the invention as set forth in the appended claims.

We claim:

1. The process of treating a metal to improve the physical qualities thereof which comprises heating the metal and treating the same with a composition containing a halide of mercury.

2. In a process of treating a metal to improve its physical qualities the step which comprises subjecting the metal to the action of a halide of mercury.

3. In a process of treating a metal to improve its physical qualities the step which comprises subjecting the metal to the action of a mercuric halide.

4. The process of improving the physical qualities of a metal which comprises heating the metal and treating the same while in heated condition with a composition containing a halide of mercury and an alkaline salt.

5. The process of improving the physical qualities of a metal which comprises heating the metal and treating the same while in heated condition with a composition containing a halide of mercury and a chloride of an alkaline metal.

6. In the treatment of a metal to improve its physical qualities the step which comprises subjecting the metal to the action of a composition containing a halide of mercury, an alkaline chloride, and a fatty acid.

7. The process of treating a metal which comprises heating the metal and subjecting the same while in heated condition to the action of a composition containing a mercuric halide, an alkaline salt, and a fatty acid.

8. The process of treating a metal which comprises heating the metal and subjecting the same while in heated condition to the action of a composition containing a mercuric halide, sodium chloride, and acetic acid.

9. The process of treating a metal which comprises subjecting the metal to the action of a composition containing a chloride of mercury, an iodide of mercury, and a fatty acid.

10. The process of treating a metal which comprises subjecting the metal to the action of a composition containing a chloride of mercury, an iodide of mercury, an alkaline salt, and a fatty acid.

11. The process of improving the physical qualities of a metal which comprises heating the metal and immersing the same while in heated condition in an acetic acid solution of mercuric chloride, mercuric iodide, and sodium chloride.

12. The process of improving the physical qualities of cold rolled steel which comprises heating the steel, submerging the same in an aqueous solution of a halide of mercury and an alkali chloride, removing the steel from the solution, reheating the same, and again submerging in the aqueous solution.

13. The process of improving the physical qualities of cold rolled steel which comprises heating the steel, submerging the same while in heated condition in an aqueous solution of mercuric iodide, mercuric chloride, and sodium chloride, removing the steel from the solution, reheating, and again submerging in the aqueous solution.

14. The process of treating nickel steel which comprises heating the steel, subjecting the same to the action of an aqueous solution of a halide of mercury and an alkali chloride, removing the same from the solution, reheating, and again submerging in the aqueous solution.

15. The process of treating nickel steel which comprises heating the steel, submerging the same in an aqueous solution of mercuric chloride, mercuric iodide, and sodium chloride, removing the steel from the solution, reheating the same, and again submerging in the solution.

16. The process of improving the physical qualities of nichrome steel which comprises heating the steel, submerging the same in an aqueous solution of a halide of mercury and an alkali chloride, removing the same, submerging in acetic acid containing a halide of mercury and an alkali chloride in solution, again heating the steel, and submerging in the first mentioned solution.

17. The process of improving the physical qualities of nichrome steel which comprises heating the steel, submerging the same in an aqueous solution of mercuric chloride, mercuric iodide, and sodium chloride, removing the steel from the solution, submerging the same in acetic acid containing mercuric chloride, mercuric iodide, and sodium chloride in solution, reheating the steel, and submerging in the first mentioned solution.

18. The process of increasing the heat resistance and toughness of nichrome steel which comprises heating the steel, immersing the same in an aqueous solution of a mercuric halide and an alkaline chloride, removing the steel, and immersing in a mixture of a chloride of mercury, an iodide of mercury, an alkaline chloride, and a fatty acid.

19. The process of increasing the heat resistance and toughness of nichrome steel which comprises heating the steel, immersing the same in an aqueous solution of mercuric chloride and sodium chloride, removing the steel, and immersing in a mixture of mercuric chloride, mercuric iodide, sodium chloride, and acetic acid.

20. The process of treating cold rolled steel which comprises heating the steel, and subjecting the same while hot to the action of an aqueous solution of a halide of mercury and an alkali salt.

21. The process of improving cold rolled steel which comprises heating the steel, and subjecting the same to the action of an aqueous solution of mercuric chloride and an alkali chloride.

22. The process of improving cold rolled steel which comprises heating the steel and submerging the same in an aqueous solution of mercuric chloride and sodium chloride.

In testimony whereof we affix our signatures.

DAVID M. TILLER.
W. W. FERREE.